US008010782B2

(12) United States Patent
Kerschbaum (10) Patent No.: US 8,010,782 B2
(45) Date of Patent: Aug. 30, 2011

(54) METHOD AND SYSTEM FOR MEDIATED SECURE COMPUTATION

(75) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 895 days.

(21) Appl. No.: 12/016,686

(22) Filed: Jan. 18, 2008

(65) Prior Publication Data

US 2009/0187757 A1  Jul. 23, 2009

(51) Int. Cl.
*H04L 29/06* (2006.01)
*H04L 9/32* (2006.01)
*H04L 9/00* (2006.01)
*H04L 9/08* (2006.01)
*G06F 21/00* (2006.01)
*G06Q 20/00* (2006.01)

(52) U.S. Cl. ........ 713/153; 713/171; 713/169; 713/170; 713/189; 380/46; 380/278; 705/50; 705/80

(58) Field of Classification Search .................... 713/153
See application file for complete search history.

(56) References Cited

U.S. PATENT DOCUMENTS

| 5,799,090 | A  | * | 8/1998  | Angert .......................... 380/43 |
| 6,115,471 | A  | * | 9/2000  | Oki et al. ...................... 380/242 |
| 6,957,341 | B2 | * | 10/2005 | Rice et al. ..................... 713/190 |
| 7,240,198 | B1 | * | 7/2007  | Pinkas et al. .................. 713/168 |
| 7,346,160 | B2 | * | 3/2008  | Michaelsen ..................... 380/28 |
| 7,386,878 | B2 | * | 6/2008  | Fernando et al. ................ 726/3 |
| 7,697,693 | B1 | * | 4/2010  | Elliott .......................... 380/278 |
| 7,711,616 | B2 | * | 5/2010  | Knapp ........................... 705/35 |
| 2003/0046198 | A1 | * | 3/2003  | Knapp et al. ................... 705/35 |
| 2003/0074330 | A1 |   | 4/2003  | Asokan et al. |
| 2003/0233328 | A1 | * | 12/2003 | Scott et al. .................... 705/50 |
| 2005/0201555 | A1 | * | 9/2005  | Yen et al. ...................... 380/30 |
| 2007/0245403 | A1 |   | 10/2007 | Ginter et al. |
| 2007/0294432 | A1 |   | 12/2007 | Takase et al. |
| 2009/0140767 | A1 | * | 6/2009  | Kolesnikov et al. ............ 326/38 |
| 2009/0187978 | A1 | * | 7/2009  | Upendran et al. .............. 726/5 |

OTHER PUBLICATIONS

Satoshi Koga, et al. "Enhancing Security of Security-Mediated PKI by One-time ID", 4th Annual PKI R&D Workshop: Multiple Paths to Trust, Apr. 19-21, 2005, NIST, Gaithersburg MD.
Dahlia Malkhi, et al., "Fairplay—A Secure Two-Party Computation System", Usenix Security Symposium, San Diego, CA, Aug. 2004.
M. Atallah, et al. "Private Collaborative Forecasting and Benchmarking", In Proceedings of 3rd ACM Workshop on Privacy in the Electronic Society (WPES), pp. 103-114, Washington D.C., Oct. 2004.

(Continued)

*Primary Examiner* — Nathan Flynn
*Assistant Examiner* — Carolyn B Kosowski
(74) *Attorney, Agent, or Firm* — Brake Hughes Bellermann LLP (57) ABSTRACT

Techniques are described for mediated secure computation. A unique identifier value may be assigned to each one of a plurality of nodes included in a network. An encrypted portion of a logical circuit may be received at a server from each of the nodes, the logical circuit including one or more gates, each gate associated with one or more logical input wires and one or more logical output wires, the logical circuit associated with a function, wherein each encrypted portion is encrypted based on a random number value that is common to the plurality of nodes and unknown at the server. A result may be obtained based on executing the logical circuit, based on combining the encrypted portions of the logical circuit received at the server.

20 Claims, 4 Drawing Sheets

OTHER PUBLICATIONS

D. Beaver, et al., "The Round Complexity of Secure Protocols", Proceedings of the 22nd ACM Symposium on Theory of Computing, 1990.

P. Bogetoft, et al., "A Practical Implementation of Secure Auctions Based on Multiparty Integer Computation", Proceedings of Financial Cryptography, 2006.

C. Cachin, "Efficient Private Bidding and Auctions with an Oblivious Third Party", Proceedings of the 6th ACM Conference on Computer and Communications Security, 1999.

G. Di Crescenzo, "Private Selective Payment Protocols", Proceedings of Financial Cryptography, 2000.

G. Di Crescenzo, "Privacy for the Stock Market", Proceedings of Financial Cryptography, 2001.

J. Feigenbaum, et al., "Sharing the Cost of Multicast Transmissions", Journal of Computer and System Sciences 63 (2001), pp. 21-41.

J. Feigenbaum, et al. "Secure Computation of Surveys", Proceedings of the EU Workshop on Secure Multiparty Protocols, 2004.

J. Feigenbaum, et al. "Distributed Algorithmic Mechanism Design: Recent Results and Future Directions", Bulletin of the EATCS 79, 2003.

O. Goldreich, "Secure Multi-party Computation" www.wisdom.weizmann.ac.il˜oded/pp.html, 2002.

J. Halpern, et al. "Rational Secret Sharing and Multiparty Computation: Extended Abstract", Proceedings of the 36th ACM Symposium on Theory of Computing, 2004.

M. Harkavy, et al., "Electronic Auctions with Private Bids", Proceedings of 3rd USENIX Workshop on Electronic Commerce, 1998.

M. Hirt, et al., "Efficient Secure Multi-Party Computation" (Extended Abstract), Proceedings of Asiacrypt, 2000.

S. Izmalkov, et al., "Rational Secure Computation and Ideal Mechanism Design", Proceedings of the 46th IEEE Symposium on Foundations of Computer Science, 2005.

A. Juels, et al., "A two-server, sealed-bid auction protocol", Proceedings of the 6th Conference on Financial Cryptography, 2002.

Y. Lindell, et al., "A Proof of Yao's Protocol for Secure Two-Party Computation", Electronic Colloquium on Computational Complexity 11, 2004.

M. Naor, et al., "Privacy Preserving Auctions and Mechanism Design", Proceedings of the 1st ACM Conference on Electronic Commerce, 1999.

S. Pohlig, et al., "An improved algorithm for computing logarithms over GF(p) and its cryptographic significance", IEEE Transactions on Information Theory 24, 1978.

Y. Shoham, et al., "Non-Cooperative Computation: boolean functions with correctness and exclusivity", Theoretical Computer Science 343(1-2), 2005.

A. Yao, "Protocols for Secure Computations" Proceedings of the annual IEEE Symposium on Foundations of Computer Science 23, 1982.

Naor, M. et al., "Privacy Preserving Auctions and Mechanism Design", Proceedings of the 1st ACM conference on Electronic commerce, Denver, Colorado, U.S., Jan. 1, 1999, pp. 129-139.

Brandt, F., "How to obtain full privacy in auctions", International Journal of information Security, vol. 5, No. 4, Mar. 31, 2006, pp. 201-216.

Yao, A. C., "Protocols for secure computations", Annual symposium on Foundations of Computer science, Jan. 1, 1982, pp. 160-164.

European Search Report Received for EP Patent Application No. 09000593.5-2415, mailed on Jun. 5, 2009, 5 pages.

Communication Pursuant to Rule 69 EPC for European Patent Application No. 09000593.5, mailed on Jul. 24, 2009, 2 pages.

Office Action Response for European Patent Application No. 09000593.5, filed on Jul. 27, 2009, 15 pages.

Office Action for European Patent Application No. 09000593.5, mailed on Apr. 6, 2010, 2 pages.

Office Action Response for European Patent Application No. 09000593.5, filed on Apr. 30, 2010, 14 pages.

Communication under Rule 71(3) EPC for European Patent Application No. 09000593.5, mailed on Jun. 25, 2010, 72 pages.

Notice of Decision to Grant European Patent for European Patent Application No. 09000593.5, mailed on Sep. 30, 2010, 2 pages.

Response to Communication under Rule 71(3) EPC for European Patent Application No. 09000593.5, filed on Sep. 17, 2010, 25 pages.

* cited by examiner

| 402 | 404 | |
|---|---|---|
| 0 | 0 | $E\ H(k_{in_i^1,0} \cdot k_{in_i^2,0} \cdot i)(k_{out_i,r_{out_i}} \oplus op_{i,r_{in_i^1} \oplus 0, r_{in_i^2} \oplus 0})$ — 406 |
| 0 | 1 | $E\ H(k_{in_i^1,0} \cdot k_{in_i^2,1} \cdot i)(k_{out_i,r_{out_i}} \oplus op_{i,r_{in_i^1} \oplus 0, r_{in_i^2} \oplus 1})$ — 408 |
| 1 | 0 | $E\ H(k_{in_i^1,1} \cdot k_{in_i^2,0} \cdot i)(k_{out_i,r_{out_i}} \oplus op_{i,r_{in_i^1} \oplus 1, r_{in_i^2} \oplus 0})$ — 410 |
| 1 | 1 | $E\ H(k_{in_i^1,1} \cdot k_{in_i^2,1} \cdot i)(k_{out_i,r_{out_i}} \oplus op_{i,r_{in_i^1} \oplus 1, r_{in_i^2} \oplus 1})$ — 412 |

METHOD AND SYSTEM FOR MEDIATED SECURE COMPUTATION

TECHNICAL FIELD

This description relates to techniques for mediated secure computation.

BACKGROUND

With the growth of activity involving transactions among large numbers of parties via large networks such as the Internet, many applications have developed in which a large number of clients may wish to obtain a result based on inputs provided by each of the clients. For example, an online auction may be set up in which a large number of users may submit bids for individual items, such that none of the bidding users has any knowledge of any others of the bidding users. Each bidding user may have an interest in winning the auction for the lowest possible bid that exceeds all other bidding users' bids. All bidding users may receive a result indicating the winning bid at the end of the auction. As an example, at the end of an auction, a bidding user may wish to contest the result, as the bidding user may know that their bid was higher than the result provided to them. However, all bidding users may wish to remain anonymous to all other bidding users, and may wish to withhold certain information from a service provider that may process the auction.

Secure multiparty computation (SMC) generally may involve a cryptographic computation of functions, such that the input of the parties may remain private (i.e., confidential with that party). Only the result (or results) may be revealed to the parties and what may be inferred from one party's input and output may be implicitly revealed. Conventional SMC may assume that a subset (e.g., a majority) of the parties are honest and complete the protocol whereas the other parties may be malicious and may eventually drop out of the protocol.

Distributed algorithmic mechanism design (DAMD) may involve computing functions, such that a result may be compatible with the utility of the collaborating agents and the computation may be efficient in computation and communication complexity. In some applications, it may be desirable for agents to keep their input private, i.e., it may be in their best interest to not reveal their input.

However, it may be difficult to prevent collusion among agents that may lead to invalid results of certain types of computations. Thus, it may be desirable to provide techniques for multiparty secure computation.

SUMMARY

According to one general aspect, a system includes a mediated secure computation manager including a unique identifier manager configured to assign a unique identifier value to each one of a plurality of nodes included in a network. The mediated secure computation manager further includes a node input receiving manager configured to receive, at a server, an encrypted portion of a logical circuit from each of the nodes, the logical circuit including one or more gates, each gate associated with one or more logical input wires and one or more logical output wires, the logical circuit associated with a function, wherein each encrypted portion is encrypted based on a random number value that is common to the plurality of nodes and unknown at the server. The mediated secure computation manager further includes a portion combining engine configured to combine the encrypted portions of the logical circuit received at the server, and a logical circuit execution manager configured to obtain a result based on executing the logical circuit, based on one or more operations of the portion combining engine.

According to another aspect, a system includes a network node processing engine including a node identifier manager configured to receive, at a node included in a plurality of nodes associated with a network, a unique identifier value assigned to the node by a server. The network node processing engine further includes a portion encryption manager configured to encrypt a portion of a logical circuit, the logical circuit including one or more gates, each gate associated with one or more logical input wires and one or more logical output wires, the logical circuit associated with a function, wherein the encrypted portion is encrypted based on a random number value that is common to the plurality of nodes and unknown at the server. The network node processing engine further includes a node portion manager configured to send, to the server, the encrypted portion of the logical circuit, and a result receiving manager configured to receive a result from the server based on execution of the logical circuit, based on combining the encrypted portion with one or more other encrypted portions of the logical circuit received at the server from one or more other nodes included in the plurality of nodes associated with the network.

According to another aspect, a method includes assigning a unique identifier value to each one of a plurality of nodes included in a network. An encrypted portion of a logical circuit may be received at a server from each of the nodes, the logical circuit including one or more gates, each gate associated with one or more logical input wires and one or more logical output wires, the logical circuit associated with a function, wherein each encrypted portion is encrypted based on a random number value that is common to the plurality of nodes and unknown at the server. A result may be obtained based on executing the logical circuit, based on combining the encrypted portions of the logical circuit received at the server.

According to another aspect, a method includes receiving, at a node included in a plurality of nodes associated with a network, a unique identifier value assigned to the node by a server. An encrypted portion of a logical circuit may be sent to the server, the logical circuit including one or more gates, each gate associated with one or more logical input wires and one or more logical output wires, the logical circuit associated with a function, wherein the encrypted portion is encrypted based on a random number value that is common to the plurality of nodes and unknown at the server. A result may be received from the server based on execution of the logical circuit, based on combining the encrypted portion with other encrypted portions of the logical circuit received at the server from one or more other nodes included in the plurality of nodes associated with the network.

The details of one or more implementations are set forth in the accompanying drawings and the description below. Other features will be apparent from the description and drawings, and from the claims.

DETAILED DESCRIPTION

Figure 1:
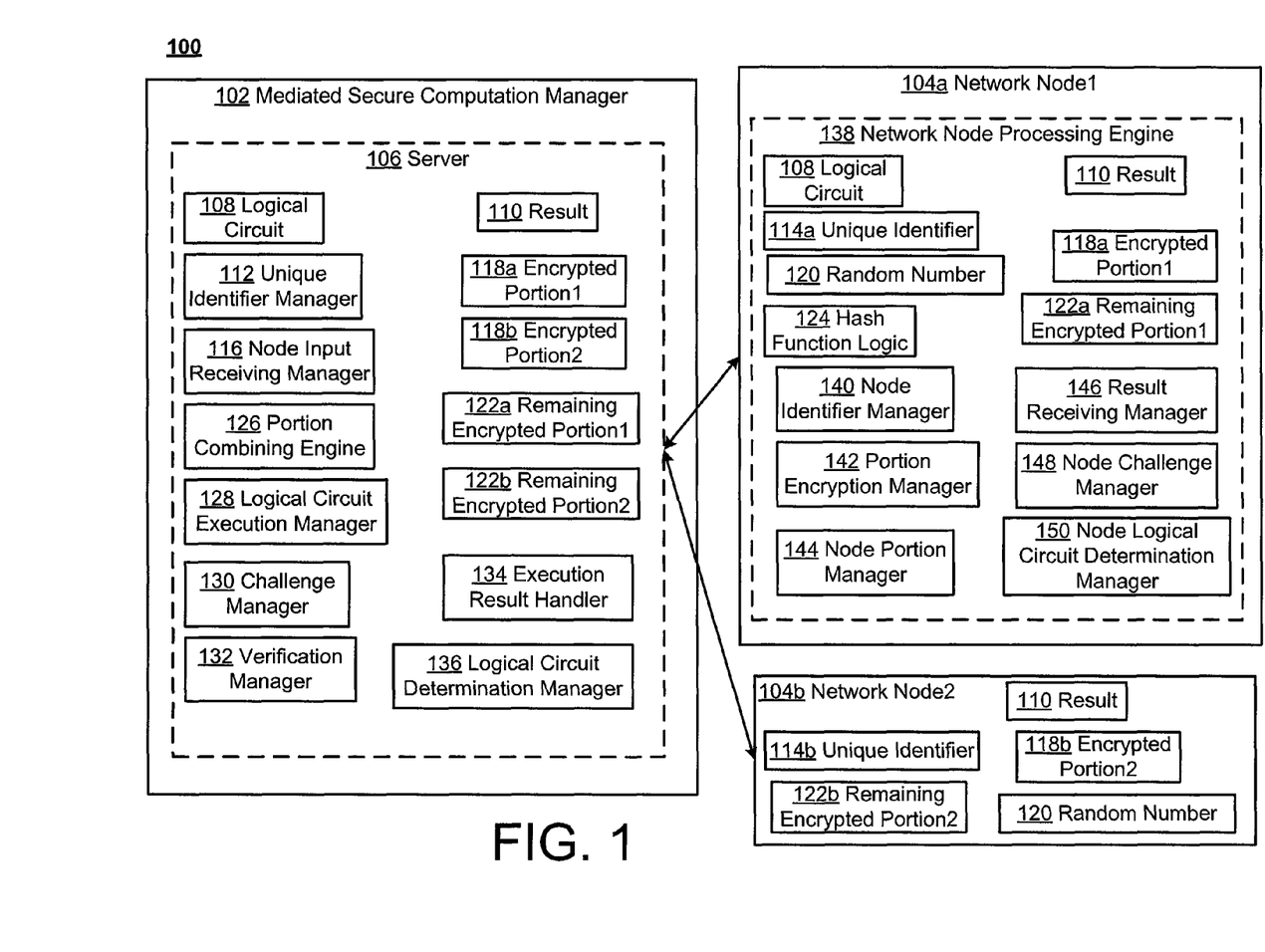
FIG. 1 is a block diagram of an example system for mediated secure computation according to an example embodiment.

FIG. 1 is a block diagram of a system 100 for mediated secure computation. In the example of FIG. 1, a mediated secure computation manager 102 includes various processing engines that obtain and process logical circuits and inputs from a plurality of nodes such as network nodes 104a, 104b. According to an example embodiment, the mediated secure computation manager 102 may include a server 106 for receiving inputs from the plurality of nodes, and may process the inputs based on a logical circuit 108, to provide a result 110 that has been requested by the network nodes 104a, 104b. For example, the server 106 may include a service provider, and the network nodes 104a, 104b may include clients of the service provider, who may communicate with the server 106 via a network such as the Internet. Although not explicitly shown in FIG. 1, there may be a large number of such nodes, for example, communicating with the server 106 via a network such as a local area network (LAN) or a wide area network such as the Internet.

The mediated secure computation manager 102 may include a unique identifier manager 112 configured to assign a unique identifier value 114a, 114b to each one of a plurality of nodes included in a network. For example, if there are n network nodes included in the network, the unique identifier manager 112 may assign the integers 1, 2, 3, . . . , n uniquely to each of the network nodes. For example, each of the network nodes may be informed of its unique identifier value 114a, 114b, and may not be informed of other network nodes' unique identifier values; however, each network node may be informed of the total number of network nodes included in the network, or the total number of network nodes that may be included in a computation of a logical circuit such as the logical circuit 108. According to an example embodiment, the server 106 may not collude with any one or more of the nodes, such as network nodes 104a, 104b.

According to an example embodiment, the unique identifier manager 112 may be configured to assign a unique identifier value 114a, 114b to each one of the plurality of nodes included in the network, based on counting values associated with a number of the plurality of nodes. For example, the unique identifier manager 112 may assign the unique identifier value 114a of 1 to the network node 104a, and the unique identifier value 114b of 2 to the network node 104b. For example, if there are n nodes included in the network, then the unique identifier manager 112 may assign a unique identifier value 114a, 114b, . . . of 1, 2, . . . , n individually to each of the n nodes.

According to an example embodiment, the mediated secure computation manager 102 may include a node input receiving manager 116 configured to receive, at the server 106, an encrypted portion 118a, 118b of a logical circuit 108 from each of the nodes, the logical circuit 108 including one or more gates, each gate associated with one or more logical input wires and one or more logical output wires, the logical circuit 108 associated with a function, wherein each encrypted portion is encrypted based on a random number value 120 that is common to the plurality of nodes and unknown at the server 106. For example, the gates may include AND gates, OR gates, exclusive-OR (XOR) gates, NOT OR (NOR), or NOT AND (NAND) gates which may include input wires and output wires configured to carry binary values (e.g., values of either 0 or 1). For example, the gates may be hard-wired, or may be represented by logic based on truth table representations of the gates, or combinations of any number of representations.

For example, the node input receiving manager 116 may receive an encrypted portion 118a of the logical circuit 108 from the network node 104a, and may receive encrypted portion 118b of the logical circuit 108 from the network node 104b. For example, the node input receiving manager 116 may receive an encrypted portion of the logical circuit 108 from the each one of n network nodes included in the network. All of the network nodes may agree on a value of the random number value 120, and the random number value 120 may be unknown at the server 106 (e.g., may be kept as a secret from the server 106), as discussed further below.

According to an example embodiment, the node input receiving manager 116 may be configured to receive, at the server 106, from each one of the nodes, the encrypted portion, based on one or more representations associated with one or more gates included in the logical circuit 108, and one or more representations of remaining encrypted portions 122a, 122b of the logical circuit 108, the one or more representations of remaining encrypted portions encrypted based on a hash function. For example, at each one of the nodes included in the network, the hash function may be applied to encrypt the one or more remaining portions 122a, 122b of the logical circuit 108 via hash function logic 124, wherein the one or more remaining portions 122a, 122b may include one or more portions of the logical circuit 108 other than the encrypted portion of the logical circuit 108 associated with the individual node, as discussed further below.

According to an example embodiment, the mediated secure computation manager 102 may include a portion combining engine 126 configured to combine the encrypted portions 118a, 118b of the logical circuit 108 received at the server 106.

According to an example embodiment, the mediated secure computation manager 102 may include a logical circuit execution manager 128 configured to obtain the result 110 based on executing the logical circuit 108, based on one or more operations of the portion combining engine 126.

According to an example embodiment, the logical circuit execution manager 128 may be configured to obtain the result 110 based on verifying a correctness of each encrypted portion 118a, 118b of the logical circuit 108 and executing the logical circuit 108, based on combining input values associated with the logical input wires associated with each one of the gates, based on truth tables associated with the encrypted portions 118a, 118b of the logical circuit 108 received at the server 106, as discussed further below.

According to an example embodiment, the mediated secure computation manager 102 may include a challenge manager 130 configured to receive, from each one of the nodes, a timestamp value and the unique identifier value 114a, 114b, encrypted based on a signature associated with the node 104a, 104b, as discussed further below.

According to an example embodiment, the mediated secure computation manager 102 may include a verification manager 132 configured to verify the representations associated with the one or more gates based on comparing the one or more representations of the remaining encrypted portions 122a, 122b received from the nodes, as discussed further below.

According to an example embodiment, the mediated secure computation manager 102 may include an execution result handler 134 configured to send the result to each of the nodes.

According to an example embodiment, the mediated secure computation manager 102 may include a logical circuit determination manager 136 configured to obtain the logical circuit 108 based on logic associated with a function that is configured to generate the result 110 based on one or more input values. For example, one or more users may determine a function that is desired to be executed on multiple inputs received from multiple parties. The logic of the function may be determined, for example, by designing a hardwired logical circuit for executing the function. As another example, program code (e.g., high level language code, assembly language code, or machine language code) may be generated that is configured to perform the function, and the program code may be compiled or assembled by a compiler or assembler to obtain a logical circuit for performing the function. For example, the logical circuit may include multiple logical gates that may include binary input wires and binary output wires.

According to an example embodiment, the mediated secure computation manager 102 may include a logical circuit determination manager 136 configured to obtain the logical circuit 108 based on logic associated with a function that is configured to generate the result 110 based on one or more input values associated with one or more of an auction, a fraud detection system, a game, a credit card clearing house system, or a competitive transaction system. For example, a credit card clearing house system may include a server that may detect fraudulent credit card transactions based on logic associated with a function configured to detect fraudulent transactions without the server receiving the actual credit card numbers for which fraudulent transactions are being made.

According to an example embodiment, the mediated secure computation manager 102 may include a logical circuit determination manager 136 configured to obtain the logical circuit 108 based on logic associated with a function that is configured to generate the result based on one or more input values, wherein the logical circuit 108 includes one or more binary gates, each binary gate configured to receive binary input values. For example, the binary gates may include logical gates such as AND, OR, XOR, NOT OR (NOR), or NAND gates.

According to an example embodiment, the system 100 may include the node 104a that may include a network node processing engine 138 that may be in communication with the server 106. For example, the connection may be via a local area network (LAN) or a wide area network (WAN) such as the Internet. Although not explicitly shown in FIG. 1, the network node 104b may also include a network node processing engine 138 that may include components similar to those discussed herein with regard to the network node 104a. Similarly, the system 100 may include a large number of network nodes configured similarly to the network node 104a discussed herein.

According to an example embodiment, the network node processing engine 138 may include a node identifier manager 140 configured to receive, at a node included in a plurality of nodes associated with a network, a unique identifier value 114a, 114b assigned to the node by a server. For example, the server may include the server 106 discussed previously.

According to an example embodiment, the node identifier manager 140 may be configured to receive, at a node included in a plurality of nodes associated with a network, the unique identifier value 114a, 114b assigned to the node by the server 106, wherein the unique identifier 114a, 114b is assigned based on counting values associated with a number of the plurality of nodes. According to an example embodiment, the unique identifier value 114a may be assigned to the node 104a by the unique identifier manager 112, as discussed previously.

According to an example embodiment, the network node processing engine 138 may include a portion encryption manager 142 configured to encrypt a portion of a logical circuit 108, the logical circuit 108 including one or more gates, each gate associated with one or more logical input wires and one or more logical output wires, the logical circuit 108 associated with a function, wherein the encrypted portion 118a, 118b is encrypted based on a random number value 120 that is common to the plurality of nodes and unknown at the server 106. For example, the logical circuit may include the logical circuit 108 discussed previously with regard to the server 106 included in the mediated secure computation manager 102.

According to an example embodiment, the network node processing engine 138 may include a node portion manager 144 configured to send, to the server 106, the encrypted portion 118a, 118b of the logical circuit 108. For example, a node portion manager 144 included in the node 104a may send the encrypted portion 118a to the server 106, and a node portion manager 144 (not shown in FIG. 1) included in the node 104b may send the encrypted portion 118b to the server 106.

According to an example embodiment, the node portion manager 144 may be configured to send, to the server 106, the encrypted portion 118a, 118b, based on one or more representations associated with one or more gates included in the logical circuit 108, and one or more representations of remaining encrypted portions 122a, 122b of the logical circuit 108, the one or more representations of remaining encrypted portions 122a, 122b encrypted based on a hash function, wherein the encrypted portion is encrypted based on a random number value 120 that is common to the plurality of nodes and unknown at the server 106. For example, the random number value 120 may include the random number 120 discussed previously.

According to an example embodiment, the node portion manager 144 may be configured to send, to the server 106, an encrypted portion 118a, 118b of the logical circuit 108, the logical circuit including one or more gates, each gate associated with the one or more logical input wires and the one or more logical output wires, each gate represented by one or more truth tables associated with the encrypted portion 118a, 118b of the logical circuit 108, wherein the logical circuit 108 is associated with a function, wherein the encrypted portion is encrypted based on a random number value that is common to the plurality of nodes and unknown at the server.

According to an example embodiment, the network node processing engine 138 may include a result receiving manager 146 configured to receive a result from the server 106 based on execution of the logical circuit 108, based on combining the encrypted portion 118a, 118b with one or more other encrypted portions of the logical circuit 108 received at the server 106 from one or more other nodes associated with the network.

According to an example embodiment, the network node processing engine 138 may include a node challenge manager 148 configured to send, to the server 106, a timestamp value and the unique identifier value 114a, 114b, encrypted based on a signature associated with the node 104a, 104b.

According to an example embodiment, the network node processing engine 138 may include a node logical circuit determination manager 150 configured to obtain the logical circuit 108 based on logic associated with a function that is configured to generate the result 110 based on one or more input values.

Figure 2:
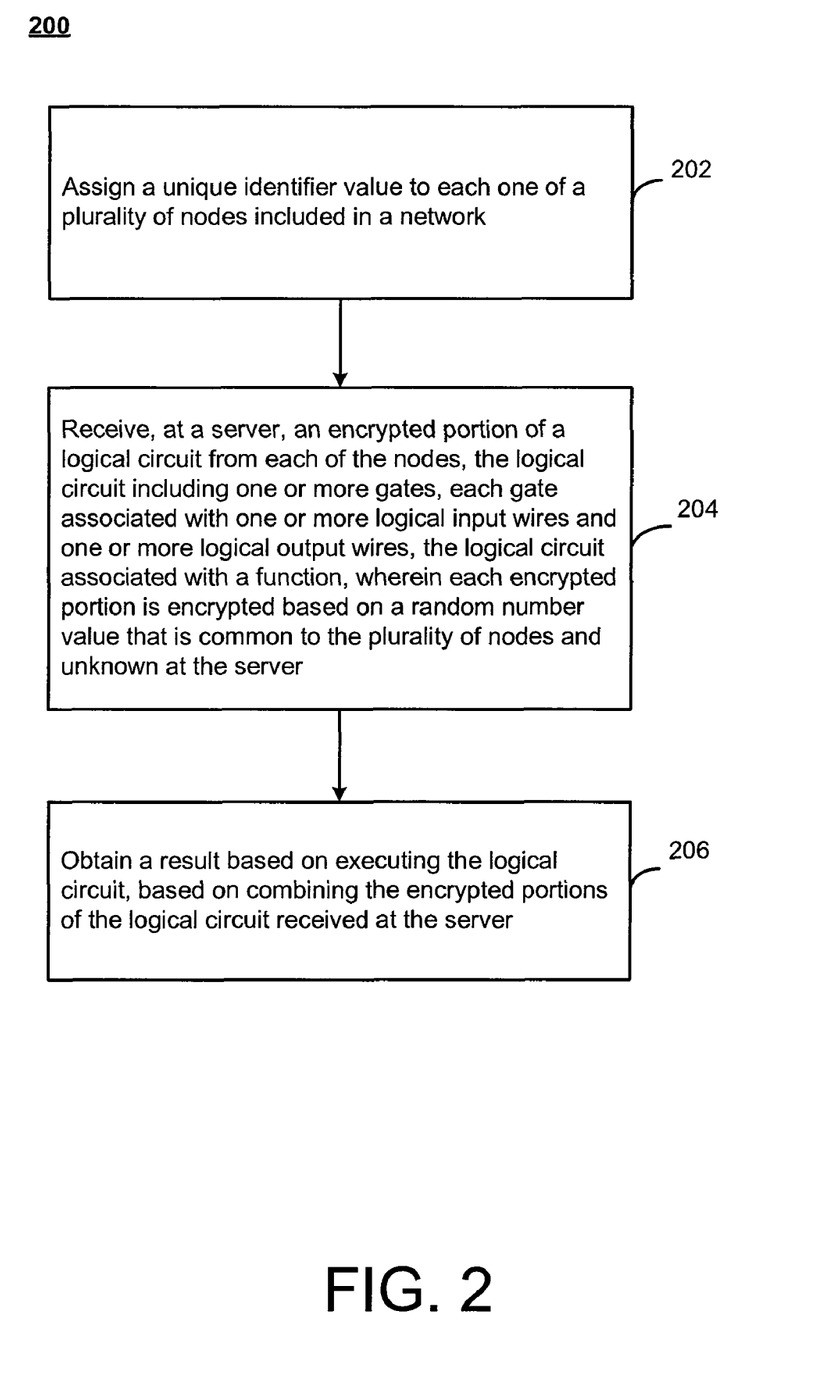
FIG. 2 is a flowchart illustrating an operation of the example system of FIG. 1.

FIG. 2 is a flowchart illustrating an example operation of the system of FIG. 1. At 202, a unique identifier value may be assigned to each one of a plurality of nodes included in a network. For example, the unique identifier value 114a, 114b may be assigned to the network nodes 104a, 104b by the unique identifier manager 112, as discussed previously.

At 204, an encrypted portion of a logical circuit may be received at a server from each of the nodes, the logical circuit including one or more gates, each gate associated with one or more logical input wires and one or more logical output wires, the logical circuit associated with a function, wherein each encrypted portion is encrypted based on a random number value that is common to the plurality of nodes and unknown at the server. For example, the node input receiving manager 116 may receive an encrypted portion of the logical circuit 108 from the each one of n network nodes included in the network, as discussed previously.

At 206, a result may be obtained based on executing the logical circuit, based on combining the encrypted portions of the logical circuit received at the server. For example, the logical circuit execution manager 128 may obtain the result 110 based on executing the logical circuit 108, based on one or more operations of the portion combining engine 126, as discussed previously.

According to an example embodiment, obtaining a result may include obtaining a result based on verifying a correctness of each encrypted portion of the logical circuit and executing the logical circuit, based on combining input values associated with the logical input wires associated with each one of the gates, based on truth tables associated with the encrypted portions of the logical circuit received at the server. For example, the logical circuit execution manager 128 may obtain the result 110 based on verifying a correctness of each encrypted portion 118a, 118b of the logical circuit 108 and executing the logical circuit 108, based on combining input values associated with the logical input wires associated with each one of the gates, based on truth tables associated with the encrypted portions 118a, 118b of the logical circuit 108 received at the server 106, as discussed previously.

According to an example embodiment, assigning a unique identifier value may include assigning a unique identifier value to each one of a plurality of nodes included in a network, based on counting values associated with a number of the plurality of nodes. According to an example embodiment, the method may further include receiving, from each one of the nodes, a timestamp value and the unique identifier value, encrypted based on a signature associated with the node. For example, the server 106 may challenge each one of the plurality of nodes. For example, the challenge manager 130 may receive, from each one of the nodes, a timestamp value and the unique identifier value 114a, 114b, encrypted based on a signature associated with the node 104a, 104b, as discussed previously.

According to an example embodiment, receiving, at a server, an encrypted portion of a logical circuit may include receiving, at the server, from each one of the nodes, the encrypted portion, based on one or more representations associated with one or more gates included in the logical circuit, and one or more representations of remaining encrypted portions of the logical circuit, the one or more representations of remaining encrypted portions encrypted based on a hash function. According to an example embodiment, the method may further include verifying the representations associated with the one or more gates based on comparing the representations of the remaining encrypted portions received from the nodes. For example, the verification manager 132 may verify the representations associated with the one or more gates based on comparing the one or more representations of the remaining encrypted portions 122a, 122b received from the nodes, as discussed previously.

According to an example embodiment, the method may further include sending the result to each of the nodes. For example, the execution result handler 134 may send the result to each of the nodes.

According to an example embodiment, the method may further include obtaining the logical circuit based on logic associated with a function that is configured to generate the result based on one or more input values. For example, the logical circuit determination manager 136 may obtain the logical circuit 108, as discussed previously.

According to an example embodiment, the method may further include obtaining the logical circuit based on logic associated with a function that is configured to generate the result based on one or more input values associated with one or more of an auction, a fraud detection system, a game, a credit card clearing house system, or a competitive transaction system.

According to an example embodiment, the method may further include obtaining the logical circuit based on logic associated with a function that is configured to generate the result based on one or more input values, wherein the logical circuit includes one or more binary gates, each binary gate configured to receive binary input values.

Figure 3:
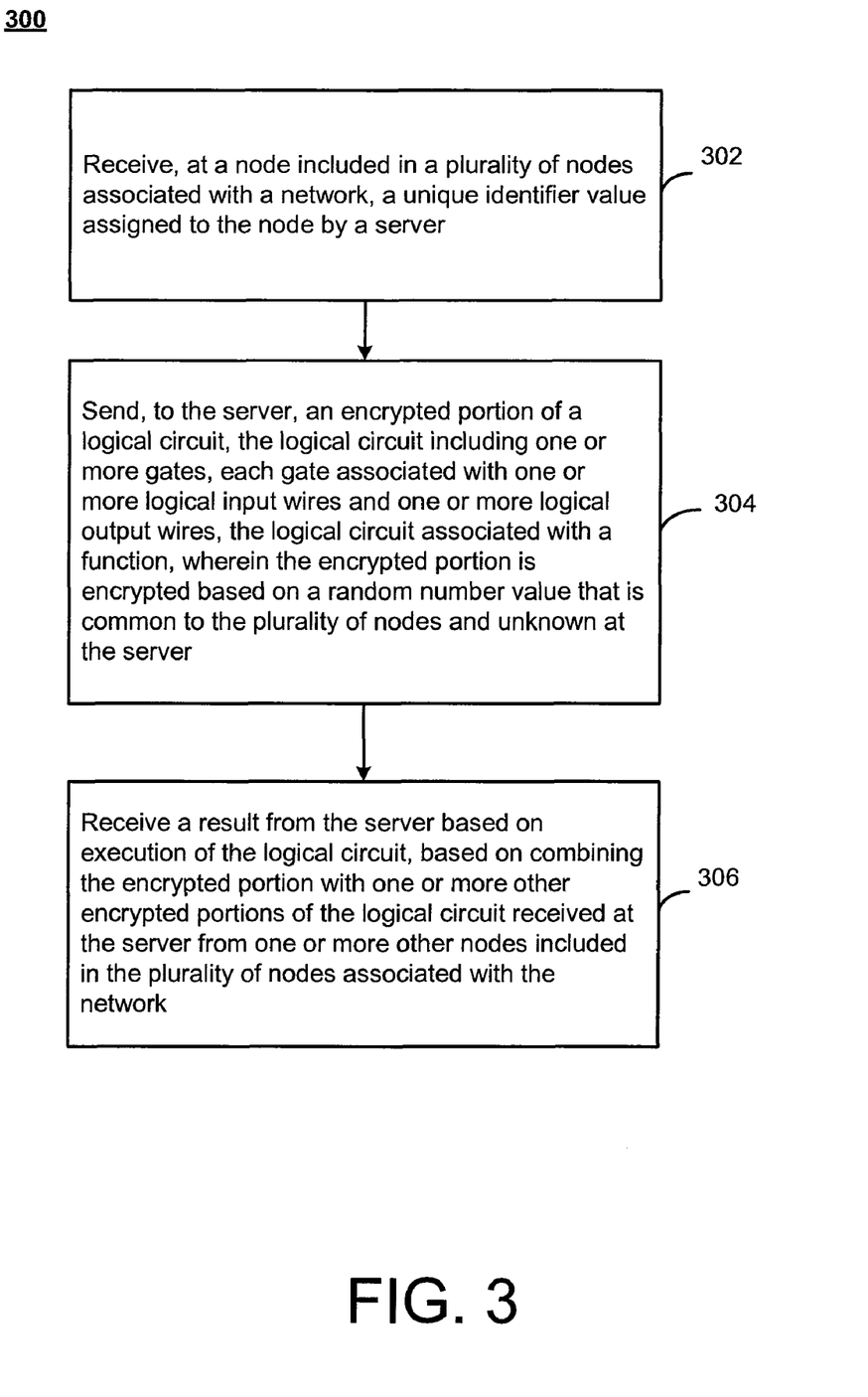
FIG. 3 is a flowchart illustrating an operation of the example system of FIG. 1.

FIG. 3 is a flowchart illustrating an example operation of the system of FIG. 1. For example, FIG. 3 may illustrate operation of the network node 104a or 104b. At 302, a unique identifier value assigned to a node by a server may be received at the node included in a plurality of nodes associated with a network. For example, the node identifier manager 140 may receive the unique identifier value 114a assigned to the node 104a by the server 106.

According to an example embodiment, the unique identifier value may be assigned based on counting values associated with a number of the plurality of nodes. For example, the unique identifier value 114a may be assigned to the node 104a by the unique identifier manager 112, as discussed previously.

At 304, an encrypted portion of a logical circuit may be sent to the server, the logical circuit including one or more gates, each gate associated with one or more logical input wires and one or more logical output wires, the logical circuit associated with a function, wherein the encrypted portion is encrypted based on a random number value that is common to the plurality of nodes and unknown at the server. For example, the portion encryption manager 142 discussed previously may encrypt a portion of a logical circuit 108.

According to an example embodiment, sending, to the server, an encrypted portion of a logical circuit may include sending, to the server, the encrypted portion, based on one or more representations associated with one or more gates included in the logical circuit, and one or more representations of remaining encrypted portions of the logical circuit, the one or more representations of remaining encrypted portions encrypted based on a hash function, wherein the encrypted portion is encrypted based on a random number value that is common to the plurality of nodes and unknown at the server. For example, the portion encryption manager 142 may encrypt a portion of the logical circuit 108, and a respective node portion manager 144, as discussed previously, may send, to the server 106, the encrypted portion 118a, 118b of the logical circuit 108.

At 306, a result may be received from the server based on execution of the logical circuit, based on combining the encrypted portion with one or more other encrypted portions of the logical circuit received at the server from the one or more other nodes associated with the network. For example, the result receiving manager 146 may receive a result from the server 106 based on execution of the logical circuit 108, as discussed previously.

According to an example embodiment, the method may further include sending, to the server, a timestamp value and the unique identifier value, encrypted based on a signature associated with the node. For example, the node challenge manager 148 may send, to the server 106, a timestamp value and the unique identifier value 114a, 114b, encrypted based on a signature associated with the node 104a, 104b.

Figure 4:
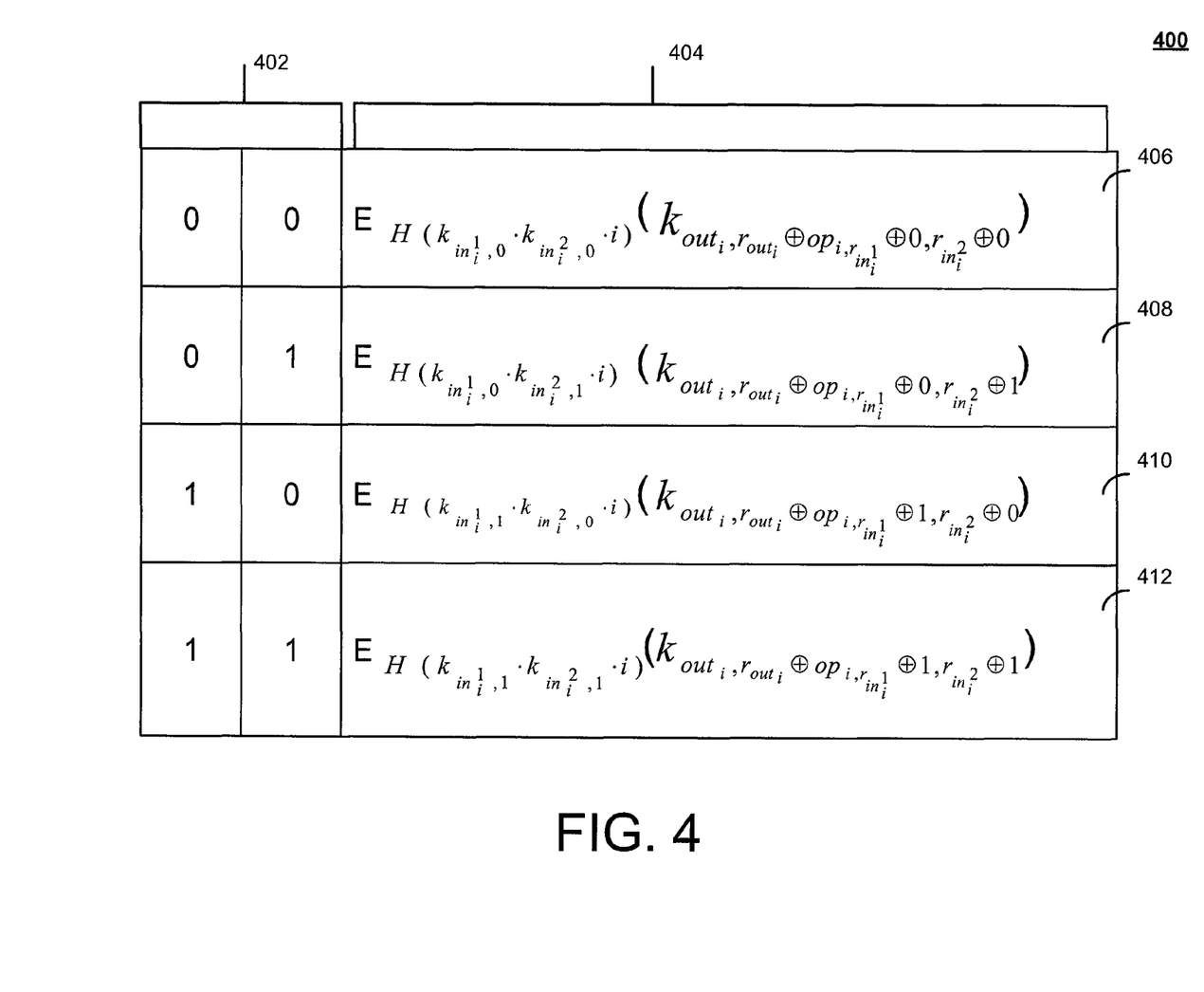
FIG. 4 depicts an example encrypted gate associated with a logical circuit represented via a truth table according to an example embodiment.

FIG. 4 depicts an example encrypted gate 400 associated with a logical circuit represented via a truth table according to an example embodiment. As shown in the example of FIG. 4, binary input values 402 may be input via logical input wires to the gate. Encrypted output values 404 as shown in FIG. 4 represent an encrypted output of a result generated as a result of an operation performed by the logical gate depicted by FIG. 4. For example, a value 406 as shown in FIG. 4 may represent an encrypted version of a result of an operation on input value pairs "0, 0" that may be input to the logical gate. Similarly, values 408, 410, and 412 as shown in FIG. 4 may represent encrypted versions of results of the operation performed on input value pairs "0, 1", "1, 0" and "1,1" that may respectively be input to the logical gate.

According to an example embodiment, a protocol for generating an encrypted version of a desired logical circuit may include generating component gates associated with the logical circuit, and encrypting portions of the gates as discussed below. For example, a binary circuit C may include gates $G=\{g_1, \ldots, g_\alpha\}$ and wires $W=\{w_1, \ldots, w_\beta\}$. For example, logical input wires associated with the gates may be denoted as $I=\{i_1, \ldots, i_\gamma\} \subset W$ and logical output wires may be denoted as $O=\{o_1, \ldots, o_\delta\} \subset W$. For example, if the gates are binary gates (i.e., the gates have inputs that may only have one of two possible values) having two inputs, then the two input wires of each binary gate $g_i$ may be denoted as $in_i^1$ and $in_i^2$ and an output wire may be denoted as $out_i$.

According to an example embodiment, for each wire $w_i$ a random bit $r_{w_i}$ may be selected, as well as two random keys $k_{w_i,0}$ and $k_{w_i,1}$, such that the last bit of a binary representation of $k_{w_i,0}$ has a value of 0 and the last bit of a binary representation of $k_{w_i,1}$ has a value of 1. According to an example embodiment, each gate $g_i$ may be represented as a truth table. For example, $op_{i,a,b}$ may denote a result of the gate $g_i$'s operation on example inputs a and b, as shown in the encrypted truth table of FIG. 4, which depicts example encrypted results of an based on an example gate $g_i$. One skilled in the art of data processing may appreciate that there may exist many representations of the gates other than truth tables, any of which may be utilized without departing from the spirit of the techniques discussed herein.

According to an example embodiment, a logical circuit for which each gate is encrypted as discussed above may be executed, if a user or entity that wishes to execute the logical circuit, has access to one key per input wire. The executing user or entity may thus decrypt one entry in the truth table and may then have access to one key of the output wire. Furthermore, if the executing user or entity (i.e., executing party) has access to only one key per input wire, the executing party also may only have access to one key for each other wire including the output wires, and the executing party may not be able to obtain more information.

According to an example embodiment, a secure multiparty computation (SMC) protocol may run at the application layer of a network stack. For example, the protocol may implement a specific or generic application. For example, there may exist multiple layers below in an example Transmission Control Protocol/Internet Protocol (TCP/IP) embodiment. According to an example embodiment, techniques discussed herein may run over the Transmission Control Protocol (TCP) with point-to-point links between example systems. Thus, a "link" may be similar to a "connection" and a TCP connection may be considered a point-to-point link. In contrast, for example, distributed algorithmic mechanism design (DAMD) protocols may run on the network layer.

According to an example embodiment, parties included in a computation may be identified by Internet Protocol (IP) addresses. Thus, each party may have a unique global identifier, which may be revealed during communication, and may thus break anonymity in direct (e.g., point-to-point) communication.

According to an example embodiment, techniques discussed herein may be provided in a web services environment. Further, web services may additionally provide an ability to establish secure channels via web services (WS)-Security.

According to an example embodiment, example techniques discussed herein may include an example protocol which may be divided into three example sub-protocols which may be referred to as collaborative anonymous identification, collaborative coin-flipping and collaborative computation protocols. According to an example embodiment, the collaborative anonymous identification protocol may include assigning each client or party to the computation (e.g., a network node) a unique identifier or identification number. For example, the unique identifier manager 112 of FIG. 1, which may be included in the server 106, may assign unique identifiers to network nodes, as discussed previously.

According to an example embodiment, the collaborative coin-flipping protocol may include selecting random numbers for garbling or encrypting the circuit for use in the collaborative computation. For example, as discussed with regard to FIG. 1, the portion encryption manager 142, included in a network node, may encrypt a portion of the logical circuit 108, wherein the encrypted portion 118a, 118b may be encrypted based on a random number value 120 that is common to the plurality of nodes and unknown at the server 106. For example, the node portion manager 144 may send, to the server 106, the encrypted portion 118a, 118b, based on one or more representations associated with one or more gates included in the logical circuit 108, and one or more representations of remaining encrypted portions 122a, 122b of the logical circuit 108, the one or more representations of remaining encrypted portions 122a, 122b encrypted based on a hash function.

According to an example embodiment, the collaborative computation may include evaluating the garbled or encrypted circuit and distributing the result(s) to the clients or parties to the computation (e.g., network nodes). For example, as discussed with regard to FIG. 1, the logical circuit execution manager 128 may obtain the result 110 based on executing the logical circuit 108, based on one or more operations of the portion combining engine 126.

As discussed previously, the collaborative anonymous identification protocol may include assigning, by the server, to each client $C_i$ (e.g., network nodes) a unique identifier i consecutively selected from 1 to n (e.g., for n clients or network nodes). These identifiers may be freshly assigned for each run of the example mediated SMC protocol, since the composition of clients or network nodes may change frequently. For example, new customers of the server may sign up, or old customers may leave. As a further example, not all customers may wish to be included in each run of the example mediated SMC protocol. For example, groups of customers bidding on auction items may change from one auction item to the next.

In a non-anonymous protocol the identification protocol may be unnecessary, since each client or network node could compute its identifier locally. In such a non-anonymous setting, each client could sort the static identities of all participants lexicographically and assign itself as identifier the rank of its static identifier.

According to an example embodiment, in a server model, the server may assign all identifiers to clients or network nodes, with no two clients or network nodes being assigned the same identifier (i.e., the network nodes are assigned unique identifiers, and all such identifiers are assigned). According to an example embodiment, the network setup may include loosely synchronized clocks between all clients.

Thus, according to an example embodiment, the server 106 may rank all static identifiers and compute the identifiers i, since the server 106 knows all clients (e.g., network nodes 104a, 104b). According to an example embodiment, the server 106 (referred to as server S below) may assign the unique identifiers to the clients or network nodes as follows:

Setup: Each client $C_i$ has a constant s and the clients' clocks are loosely synchronized. The server S does not know s.
1. The server S sends i=1 and n to client $C_1$.
2. Client $C_1$ produces a random challenge c, a timestamp timestamp and its signature (message authentication code) MAC(timestamp.c, s). Client $C_1$ also signs its identifier sig=MAC(c.1, s) and sends this signature sig and c, timestamp, MAC(timestamp.c, s) to the server S.
3. The server S sends the identifier i, n, c, timestamp, and MAC(timestamp.c, s) to each client $C_i$ (i $\in$ [2, n]) other than $C_1$.
4. Each client $C_i$ (except $C_1$) verifies that
   the timestamp timestamp is fresh
   the signature MAC(timestamp.c, s) is correct
Then the client $C_i$ returns MAC(c.i, s) to the server S.
5. The server S sends v=H(MAC(c.1, s) . . . MAC(c.n, s)) to each client $C_i$ (including $C_1$).
6. Each client $C_i$ verifies the received v=H(MAC(c.1, s) . . . MAC(c.n, s)).

According to an example embodiment, the client $C_i$ may compute the signature locally.

According to an example embodiment, the identification protocol may have constant communication complexity (O(1)) over linearly many links (O(n)). The example protocol may be considered "network efficient."

In the collaborative coin-flipping protocol the clients $C_i$ or network nodes may agree on a random number, such that the selection is fair, i.e., one client or network node may not dominate the selection. Furthermore, the selected r remains unknown, or secret from the server S.

One example collaborative coin-flipping protocol may be performed as follows:
1. Each client $C_i$ may commit to its input $x_i$ using a cryptographic hash function H(x) and may send that commitment to all other clients $C_i$.
2. After receiving all commitments each client $C_i$ may reveal $x_i$ to each other client.
3. The clients $C_i$ may set the result to the exclusive-or of all inputs:

$r = \oplus_{i=1}^{n} x_i$.

However, such an example protocol may use quadratically many links and have an overall communication cost that is $O(n^2)$. If the communication is channeled through the server, the messages may need to be encrypted, so that the server cannot read them. Even if a common key is used among all clients, unknown to the server, the server may still reply with a message that includes all inputs that has linear communication cost O(n) over linearly many links. Thus, a different scheme may be more efficient, at least in terms of communication cost. However, since the server is not involved in the coin-flipping, fairness may be ensured, and the commitment protocols may become unnecessary.

According to an example embodiment, a shared secret s and a common key associated with a homomorphic encryption technique may be provided. For example, if p is a large odd prime number and de mod p−1=1 with e>1, then each $r^e$ mod p may provide an example encryption associated with an encryption technique associated with Pohlig-Hellman. Thus, $(r^e)^d$ mod p=r.

Such an example encryption technique may, for example, be homomorphic in the multiplication operation $r_1^e r_2^e = (r_1 r_2)^e$ According to an example embodiment, a secret key (e, p) of a Pohlig-Hellman encryption scheme may be made known to all clients $C_i$, wherein the server S only knows p, as knowledge of p may not break the security of the example encryption.

According to an example embodiment, an example pseudo-random number generator may generate $PRNG_i(s)$ as an i-th random number, given seed s. According to an example embodiment, the example collaborative coin-flipping protocol may be performed as follows:

Setup: The clients $C_i$ or network nodes may run the example collaborative anonymous identification protocol, and may be assigned unique identifiers numbered from 1 to n. Each client $C_i$ or network node has constant values s, e, p and a randomly chosen input $x_i$. The server S has the value p.
1. Each client $C_i$ may send $c_i = (PRNG_i(s)x_i)^e$ mod p to the server S ($0 < x_i < p$).
2. Upon receiving all encrypted inputs $c_i$ ($0 < c_i < p$), the server S may send to each client $C_j$ $$c'_j = \prod_{i=1}^{j-1} c_i \prod_{i=j+1}^{n} c_i \bmod p$$

3. Each client $C_i$ may set $$r = \frac{(c'_i)^d x_i}{\prod_{j=1}^{i-1} PRNG_j(s) \prod_{j=i+1}^{n} PRNG_j(s)} \bmod p = \prod_{j=1}^{n} x_j \bmod p$$

According to an example embodiment, upon sending the values $c'_j$, the server S may exclude all clients or network nodes from this and subsequent protocols, if they do not deliver the encrypted input, for example, within a predetermined time interval. According to an example embodiment, such an example protocol may be fair even against a server S that tries to dominate the outcome. For example, neither can the server S replay a previous encrypted value, since each client $C_i$ may decrypt and multiply the received value with its own input, nor can the server compute the inverse of each client's encrypted input, return it and force the clients to decrypt to r=1 (or any other chosen cipher text), since each client $C_i$ may divide the result by a different constant derived from the shared secret s, and unknown to the server S. However, if the server were able to force clients to the same identifier in the collaborative anonymous identification protocol, this assumption may not hold. Additionally, the server may refuse any $c_i=0$ and the clients may refuse any $c'_j=0$ resulting in r=0, as this may not provide a valid result with the constraint ($x_i>1$).

Such an example technique may provide constant O(1) communication cost (i.e., linear in a security parameter k=O (log p)) over linearly many links (O(n)), and may thus be considered "network efficient."

According to an example embodiment, the server S may execute the logical circuit encrypted by the clients $C_i$ or network nodes in accordance with the example collaborative computation protocol. According to an example embodiment, the collaborative computation protocol may be performed as follows:

Setup: The clients $C_i$ or network nodes may execute the example collaborative coin-flipping protocol and agree on a random number r unknown to the server S.
1. Using r (e.g., as a seed in a pseudo-random number generator), each client $C_i$ or network node may select random bits $r_i$ and keys $k_{i,0}$, $k_{i,1}$ and may generate the encrypted circuit. The clients $C_i$ may set $r_o$ to 0 for $o \in O$ (i.e., the result may not be garbled).
2. If $\alpha$ denotes the number of gates $G=\{g_1, \ldots, g_\alpha\}$ in the logical circuit (w log it may be possible that $\alpha$ mod n=0), and if $$G_i = \{g_{\frac{\alpha(i-1)}{n}+1}, K, g_{\frac{\alpha i}{n}}\}$$

denote client $C_i$'s fraction, or portion, of the logical circuit C, and $x_{i,j}$ denotes the bit of $C_i$'s input on wire j (j $\in I_i \subset I$), then each client $C_i$ may send $G_i$, $H(G\setminus G_i)$ and $k_{j, r_j \oplus x_{i,j}}$ for $j \in I_i \subset I$ to the server S (e.g., similarly as shown in the example truth table representing an example gate $g_i$ of FIG. 4).
3. The server S may verify the correctness of each hash $H(G\setminus G_i)$ after receiving the logical circuit portions $G_i$. If they all match, the technique may continue; otherwise, an example technique for detecting malicious clients may be initiated, as discussed below. Thus, the server S may execute the circuit C and directly obtain the result f. The server S may then send or distribute f to each client $C_i$. If an entry of a gate cannot be decrypted, the example technique for detecting malicious clients may be initiated, as discussed below.

According to an example embodiment, such an example technique may provide a network complexity of $$O\left(\frac{\alpha}{n}\right)$$

communication over linearly many (O(n)) links. For example practical problems associated with e-commerce providers, such as auctions (best-price, second-price, etc.) or benchmarking, the circuit size $\alpha$ may be linear in the number of participants: $\alpha=O(n)$. Then the example technique may be considered "network efficient" with a constant communication cost over linearly many links.

According to an example embodiment, maliciously modified logical circuits may be detected as discussed below. Each client $C_i$ or network node may send a hash of the logical circuit, excluding the client's fraction or portion, to the server S. The server S may verify, by recomputing the hashes, that every client did send the correct fraction or portion of G. If a client maliciously modifies its fraction (and all other clients do not collude with that client), the hashes of all other clients will be incorrect.

According to an example embodiment, in order to detect which client $C_i$ or network node misbehaved, and exclude that client from future computations, the server S may request that all clients reveal G to the server S. The server S may then exclude the malicious client (or clients) by comparing the submitted $G_i$s to the majority. This example technique may succeed if only a minority $$t < \frac{n}{2}$$

of n clients is malicious.

According to an example embodiment, if a decryption of a gate entry fails (e.g., because a client $C_i$ sends a false key for its input), the server S may request that asks all clients $C_i$ reveal all $k_{i,0}$. The server S may then compare the inputs to the majority again and exclude false submitters. However, a majority of malicious clients $C_i$ may force the server to exclude an honest minority using this technique. However, at this point in the example technique no random bits $r_i$ have been revealed, and privacy against t=n−1 clients is still maintained.

According to an example embodiment, such an example procedure may be effective against rational attackers. For example, a rational attacker may be interested in obtaining the result and withholding the result from other clients $C_i$. Such an attacker may modify the random bits $r_o$ for all output wires $w_o$ ($w_o \in O$) in its fraction or portion $w_o \in G_i$. The attacker may obtain the correct result, since it knows $r_o$, but all other clients (and the server S) may be oblivious to the correct result (or a fraction or portion of the correct result). In accordance with the example technique, such an attacker may be excluded if it attempts this attack, and thus its rational behavior may be expected to change to complying with the example protocol.

According to an example embodiment, revealing G in order to detect malicious clients may be avoided. For example, if each client $C_i$ sends n−1 hashes $H(G_1), \ldots, H(G_{i-1}), H(G_{i+1}), \ldots, H(G_n)$ to the server S, the server S may determine the malicious clients from the majority of the corresponding hashes for its fraction of G. Such an example technique may provide communication complexity O(max (alpha/n, n)) over linearly many links, which may have a lower bound of O(n) over linearly many links, and thus, may not be considered "network efficient." However, in practice, due to the small size of the cryptographic hashes, this example technique may still be efficient.

Security may be divided into security against semi-honest and malicious attackers. For example, semi-honest attackers may follow the example techniques as described, but may keep a record of the interaction. They may then try to infer as much information as possible about the other parties' input from this record. A malicious attacker may be allowed to deviate in arbitrary ways from the example techniques. Certain attacks, such as input substitution and early abort, may not be prevented in the presence of malicious attackers.

According to an example embodiment, the example collaborative coin-flipping protocol as a secure building block may be replaced, for example, by an ideal oracle functionality.

No information regarding the parties' input other than the logical circuit and keys is revealed to any party other than the server S. According to an example embodiment, in a semi-honest model, given an n-ary function f, the example mediated SMC protocol may n−1-privately compute f in the semi-honest model if the server S is honest. For example, as all clients $C_i$ may receive only one message in the collaboration protocol, which is the result of f, they may not infer any more information, since the result may be always revealed. Thus, no collusion of up to n−1 clients may be able to infer anything about any other client's input.

According to an example embodiment, in a semi-honest model, given an n-ary function f, the example mediated SMC protocol may 1-privately compute f. Thus, the server S may not receive any information about the inputs as well (as long as the server S does not collude with any of the clients $C_i$ or network nodes). Further, the example protocol may be secure against malicious clients as well, as discussed previously.

According to an example embodiment, given an n-ary function f, the example mediated SMC protocol may securely compute f, if t<n/2 clients are malicious and the server S is semi-honest. For example, if a minority t<n/2 of clients maliciously submit false input, an example detection technique as discussed previously may exclude the clients from the protocol. The majority may complete the protocol. Thus, a minority of clients may fail arbitrarily.

According to an example embodiment, malicious behavior by the server S may be prevented as well. The server's only chance to maliciously (and undetectably) influence the protocol may occur when sending the result. If the server S sends, with the result, a proof that indicates that the result has been computed according to the logical circuit C, the clients may be able to verify the server's honesty. Such a proof may be provided by the server sending the keys $k_o$ for the output wires ($o \in O$) to the clients $C_i$. According to an example embodiment, given an n-ary function f, the example mediated SMC protocol (augmented with an additional proof by the server) may 1-securely compute f in the malicious model.

As discussed below, protocol-compliant behavior (as may be included for semi-honest security) may be rational for the server. The discussion below regards situations that may involve rational behavior of the clients, i.e., each client acting in its own best interest. Thus, each client $C_i$ may be interested in learning the correct result of the computation, and as a second preference the client may be interested in withholding the result from other clients. According to an example embodiment, the server S may acts as a mediator (e.g., providing mediated secure computation) in the protocol. For example, if the server is being paid for its services, then it may be in its best interest to deliver the correct result to the paying clients.

In the field of game theory, a strategy for client $C_i$ or server S may be considered a (possibly randomized) function of local information to actions. A joint strategy $\vec{\sigma}=(\sigma_1, K, \sigma_{n+1})$ may include a tuple of strategies, one for each client $C_i(\sigma_i)$ and one for the server S ($\sigma_{n+1}$). For example, $U_i(\vec{\sigma})$ may denote player i's (server or client) expected utility, if $\vec{\sigma}$ is played.

For example, $\vec{\sigma}_{-i}$ may denote a tuple that incoudes each player's strategy in $\vec{\sigma}$ other than player i's. A Nash equilibrium may refer to a joint strategy, such that no player has any incentive to do anything different (given what the other players are doing). Thus, $\vec{\sigma}$ may denote a Nash equilibrium, if for all players i and strategies $$\sigma'_i : U_i(\vec{\sigma}_{-i}, \sigma_i) \geq U_i(\vec{\sigma}_{-i}, \sigma'_i).$$

A game may have many Nash equilibria, some of which may be unrealistic in practice, and thus, game theory may provide improvements of the Nash equilibrium. As an example, in DAMD, a weakly dominant strategy may refer to a strategy that, regardless of what any other players do, earns a player a payoff at least as high as any other strategy, and, that earns a strictly higher payoff for some other players' strategies. Thus, for example, a strategy $\sigma_i$ may be considered weakly dominant, if there exists a tuple of strategies of other players $\vec{\sigma}'_{-i}$, such that $U_i(\vec{\sigma}_{-i}, \sigma_i) > U_i(\vec{\sigma}'_{-i}, \sigma_i)$, and for all tuples of strategies of other players $\vec{\sigma}'_{-i}$ and all strategies $\tau$ there is a result that $U_i(\vec{\sigma}'_{-i}, \sigma_i) \geq U_i(\vec{\sigma}'_{-i}, \tau)$.

According to an example embodiment, a function f may be referred to as non-cooperatively computable if there exists a dominant strategy, such that clients $C_i$ may compute f using a trusted third party. Further, f may be considered (deterministically) non-cooperatively computable, if for any client $C_i$, every strategy $\sigma_i$ and every input $x_i$ of i, either there exists an outcome of f, such that $\sigma_i$ does not compute that outcome, or else the outcome is oblivious to $\sigma_i$.

For example, r and r' may be runs in the game tree, info(r) may be a tuple $(s_1, \ldots, s_n)$ where $s_i$ is 1 if client $C_i$ receives the correct result from the server, and is 0 otherwise, and if $info_i(r)=s_i$, then it may be true that:

C1. $u_i(r)=u_i(r')$ if info(r)=info(r')
C2. If $info_i(r)=1$ and $info_i(r')=0$, then $u_i(r)>u_i(r')$
C3. If $info_i(r)=info_i(r')$, $info_j(r) \leq info_j(r')$ for all $j \neq i$, and there exists some j, such that $info_j(r)<info_j(r')$, then $u_i(r)>u_i(r')$.

For example, compute(r) may be a tuple $(s_1, \ldots, s_n)$ where $s_i=1$ if client $C_i$'s input is included in the computation, and is 0 otherwise. Further, $\overline{compute}(r)$ may denote the element-wise negation of compute(r). An example assumption on the utility function of the server may include:

S1. $u_S(r)>u_S(r')$ if $\Sigma_{i=1}^n$ compute(r)^info(r)$>\Sigma_{i=1}^n$ compute(r')^info(r')
S2. $u_S(r)<u_S(r')$ if $\Sigma_{i=1}^n$ $\overline{compute}(r)$^inf o(r)$>\Sigma_{i=1}^n$ $\overline{compute}(r')$^info(r')

According to an example embodiment, the rational security of the mediated SMC protocol may lead to the following: If the clients' utilities satisfy C1-C3 and the server's utility satisfies S1-S2, then example protocol compliant behavior in the example mediated SMC protocol for non-cooperatively computable functions f may be a weakly dominant strategy. For example, considering the alternative choices for a client, and assuming that a client submits false input or no input (e.g., deviating from the protocol in the malicious model), the client may then always receive a lower pay-off (no matter what the server does), since $info_i(r)=0$. According to an example embodiment, the server delivering the computed result to all not excluded clients only has a higher pay-off than all other strategies if all not excluded clients submit the correct input. No strategy may have a higher utility, since the maximum number of not excluded clients and the minimum number of excluded clients may learn the result.

For example, if the server S does not exclude malicious clients, the server may reduce his pay-off, since the number of clients that will learn the correct result is reduced. Consequently, excluding malicious clients may maximize the number of clients that may receive the correct result.

According to an example embodiment, if assumption S2 is omitted, then it may be rational for the server to deliver the result to all clients (even excluded ones), yet still exclude malicious clients from the computation. According to an example embodiment, this business case may be extended to interested third parties who purchase only the result. However, it may be desired for the server to punish misbehaving clients to reduce the computational cost, i.e., reduce the number of necessary reruns of the protocol.

According to an example embodiment, anonymity may be important from the perspective of the clients, server or application. For example, clients may not want to reveal their participation in the protocol. For example, the server may benefit economically from not having to reveal its customers to every client. For example, certain applications may only be possible with anonymity, e.g., multi-group benchmarking.

Anonymity may be broken by any static identifier, e.g., IP addresses or public keys. A static identifier may include a piece of information specific to an entity that does not change between multiple runs of an example protocol. Even pseudonymous identifiers such as public keys may reveal the composition of the clients by comparison of multiple runs.

An example mediated SMC protocol may efficiently provide a certain form of anonymity. The clients in the protocol may remain anonymous among each other, but the server may be known to every client. This may thus achieve all three privacy goals: clients, server, and application.

The clients may not reveal their participation in the protocol (except to the server).

The server does not have to reveal its customers to any client.

The participants in the application (clients) remain anonymous.

Furthermore, the server may charge the clients for the service as an economic motivation. The server may know the identity of each client and may charge them, but does not have to reveal them. Thus, according to an example embodiment, the clients of the example mediated SMC protocol may remain anonymous among each other. For example, the communication in all the involved example protocols may be only between a client and the server, i.e., no clients may exchange messages directly. Thus, the communication does not break anonymity among the clients (e.g., by IP addresses). According to an example embodiment, the clients' only identifying information in the example protocol is the identifier i chosen by the server in the example collaborative anonymous identification protocol. This identifier may be known only to the client and the server and may not be shared explicitly or implicitly. All key information may be shared among all clients. Therefore the example protocols discussed previously may not break anonymity among the clients.

As an example deployment consideration, in considering auctions, it may be desirable to defend the outcome of the auction against potential claims of competitors. Privacy-preserving auctions may prevent an auctioneer from knowing the bids before (and possibly after) the protocol runs. According to an example embodiment, accusations that individual bids may have been leaked to competitors before auction closing may be avoided by use of the example techniques discussed herein. Nevertheless bidders may require confirmation of their bids, especially since in privacy-preserving auctions there may be a delay between submitting a bid and executing the protocol. For example, such a confirmation may act as a proof that the client has submitted a certain bid in case the auction shows a different result. For example, the client may not have been able to participate in the collaborative computation protocol and may have been excluded after timeout. Such a situation may not even be the client's fault, and may be due to a network problem.

As another example, the confirmation may not be abused to proof a bid that has never been submitted. A client may not be able to claim bids after the auction the client never has submitted or intended to submit. As discussed previously, collusion of a client with the server may be excluded, and the confirmation may include an example protocol between one client and the server only.

According to an example embodiment, the confirmation may include an example bit-commitment protocol, which may include two phases: First, the committer may send a commitment commit(m) to a message m. This commitment may not reveal any information about m. Second, the committer may open the commitment by sending m. The committer may not be able to open its commitment for any other message m'≠m.

According to an example embodiment, an overall example mediated SMC protocol for auctions may be performed as follows:

1. All potential clients and the server S may engage in the example collaborative anonymous identification and coin-flipping protocols.
2. Potential clients may submit their bids, receive confirmation and become full clients.
3. All full clients may engage in the example collaborative computation protocol, setting all inputs of potential, but not full clients to 0.

According to an example embodiment, an example confirmation that a client may receive for submitting a bid may be received as follows:

1. Client $C_i$ may submit commit($k_{j,x_{i,j} \oplus r_j}$), and commit($r_j$) for each $j \in I_i \subset I$ of its input wires $I_i$.
2. The server S may send a timestamp timestamp and signature $D_S$(timestamp.commit($k_{j,x_{i,j} \oplus r_j}$).commit($r_j$)) of the commitments to the client $C_i$. For example, in the case of auctions, the server S may also include an auction identifier and a (static) identity of the client $C_i$.

Upon starting the example collaborative computation protocols after the client $C_i$ has opened the commitment to $k_{j,x_{i,j} \oplus r_j}$ (e.g., between steps 2 and 3 shown above), the server may perform a verification of the commitment.

2a. The server may verify the commitment commit($k_{j,x_{i,j} \oplus r_j}$) of each client $C_i$. On a false commitment, the server S may exclude the client from the computation similarly as discussed previously.

In case of a dispute, the client $C_i$ may claim its bid to a trusted third party. The clients $C_i$ may show the two commitments (for the client's input and for the random garble bits) commit($k_{j,x_{i,j} \oplus r_j}$) and commit($r_j$), the timestamp timestamp and their signature by the server S ($D_S$(timestamp.commit($k_{j,x_{i,j} \oplus r_j}$). commit($r_j$))). This may convince the trusted third party that the commitments have been made to the server S.

The client $C_i$ may then open the commitments and the combination of $k_{j,x_{i,j} \oplus r_j}$ and $r_j$ may provide a means to reconstruct $x_{i,j}$ for $j \in I_i$ and finally $x_i$ which is the bid submitted in plain text. The trusted third party may then be able to verify the bid as submitted and resolve the dispute.

In a conventional common random string (CRS) model for cryptographic protocols, all parties may have access to a common random string at the start of the protocol. The example techniques discussed herein, however, may at least provide that the server may not have access to the common secret "keys" (s and e), and that the example techniques may be run multiple times with the same keys (e.g., "random string"). The example collaborative coin-flipping protocol discussed herein may select a new random number for each run of the computation protocol.

According to an example embodiment, an example key distribution technique may be provided similar to the public-key infrastructure (PKI) model. In the PKI model all parties may share the public key of a trusted root. The trusted root may then issue certificates to each party certifying their public key (by signing it with their secret key). Such certificates may be issued indirectly via chains.

The PKI model has been commonly adopted throughout the Internet, due in part, to a widespread use of the Secure Socket Layer (SSL) protocol. The SSL protocol may establish secure and authenticated channels based on PKI protocols.

According to an example embodiment, a key distribution for the example techniques discussed herein may uses a certificate authority (CA) as a dealer of the secret keys. Thus, the CA may act as a trusted third party and may not collude with the server S. One skilled in the art of data processing may appreciate that there may exist many established CAs whose business model relies on their trustworthiness and ability to keep data confidential (such as their private key).

According to an example embodiment, a client may register for a service at the server S as discussed below. For example, the server S may act (e.g., in accordance with rationality assumptions) as a service provider offering a privacy-preserving service to its clients. According to an example embodiment, each client $C_i$ may first contact the server, and they may perform the following:
1. Client $C_i$ may obtain the certificate of the server S that includes its public key $E_S(\cdot)$.
2. Client $C_i$ may send to the server S its identity $C_i$ along with the registration information, e.g., its intended username, password and credit card information, encrypted with the public key of the server: $E_S(C_i, \text{info})$.
3. The server S may verify the registration information (e.g., charges the credit card) and may return over a secure channel an encrypted and signed token with timestamp:

$$E_{CA}(C_i, \text{timestamp}, D_S(C_i, \text{timestamp})).$$

Once the client $C_i$ has received the token, the client $C_i$ may contact the CA and engage in the following protocol. According to an example embodiment, the server S may assist and offer a link to the CA that may forward the token automatically.
1. Client $C_i$ may send its public key $E_{C_i}(\cdot)$ and the token, i.e., $E_{CA}(E_{C_i}(\cdot), E_{CA}(C_i, \text{timestamp}, D_S(C_i, \text{timestamp})))$ to the CA.
2. The CA may verify the freshness and signature of the token and the identity information (e.g., a supplied e-mail address). It may then issue a certificate to the client $C_i$ for its public key: $\text{Cert}_{CA}(C_i) = (C_i, E_{C_i}(\cdot), D_{CA}(C_i, E_{C_i}(\cdot)))$. According to an example embodiment, the CA may return the certificate $\text{Cert}_{CA}(C_i)$, and the secret keys of the protocol $E_{C_i}(s, e)$ to $C_i$.

According to an example embodiment, the client $C_i$ may now engage in the example mediated SMC protocol with the server S, as the client $C_i$ has obtained a certificate from a common trusted root to establish a secure and authenticated channel and the secret keys (s and e) for use in the protocol. According to an example embodiment, depending on the method used to establish secure channels, the client $C_i$ may first need to forward the certificate to the server in a separate step.

According to an example embodiment, this certificate procurement may only be performed once, when the client signs up for the service.

According to an example embodiment, an example SMC protocol may use a central server to mediate the protocol. The central server may provide a more practical and efficient network coordination of the protocol.

According to an example embodiment, such a protocol may provide security against rational players that want to obtain the correct result and as a second preference withhold it from as many other players as possible. According to an example embodiment, the server may want to deliver the correct result to as many cooperating clients as possible, for example, because the owner of the server may be paid for delivering such a correct result.

According to an example embodiment, a simple protocol for secure multi-party computation of any function may provide anonymity of the clients or parties of the computation among themselves, which may be advantageous, for example, in environments in which a service provider model may be desired. For example, the service provider may not have to reveal the identity of its customers to each other.

According to an example embodiment, a simple protocol for secure multi-party computation of any function may be based on an example single server SMC protocol.

According to an example embodiment, a simple protocol for secure multi-party computation of any function may be based on an example technique using garbled logical circuits. According to an example embodiment, a network including a plurality of network nodes may use one server to compute the function securely and privately and distribute the results to all of the network nodes. According to an example embodiment, the protocol may not protect against collusion with the server; however, it may resolve one or more dilemmas of distributed algorithmic mechanism design. For example, the "network complexity" may be low (i.e., the communication complexity of each participant may be constant for many practical problems). For example, the protocol may be completed in a fixed, constant number of rounds in the presence of rational parties or users. As another example, the clients or users of the computation may remain anonymous and unknown among each other. As yet another example, the computation may be completed with only one server.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
    a mediated secure computation manager including:
        a unique identifier manager configured to assign a unique identifier value to each one of a plurality of nodes included in a network;
        a node input receiving manager configured to receive, at a server, an encrypted portion of a logical circuit and a set of keys corresponding to the node's input on respective logical wires from each of the nodes, the logical circuit including one or more gates, each gate associated with one or more logical input wires and one or more logical output wires, the logical circuit associated with a function, wherein each encrypted portion is encrypted based on a random number value that is common to the plurality of nodes and unknown at the server;
        a portion combining engine configured to combine the encrypted portions of the logical circuit received at the server; and
        a logical circuit execution manager configured to obtain a result based on executing the logical circuit, based on one or more operations of the portion combining engine and based on the sets of keys received from each of the nodes.

2. The system of claim 1 wherein:
    the unique identifier manager is further configured to assign the unique identifier value to each one of the plurality of nodes included in the network, based on counting values associated with a number of the plurality of nodes,
    the node input receiving manager is further configured to receive, at the server, from each one of the nodes, the encrypted portions, based on one or more representations associated with one or more gates included in the logical circuit, and one or more representations of remaining encrypted portions of the logical circuit, the one or more representations of remaining encrypted portions encrypted based on a hash function, wherein the mediated secure computation manager further comprises:
    a challenge manager configured to receive, from each one of the nodes, a timestamp value and the unique identifier value, encrypted based on a signature associated with the node; and
    a verification manager configured to verify the representations associated with the one or more gates based on comparing the representations of the remaining encrypted portions received from the nodes.

3. The system of claim 1, wherein the mediated secure computation manager further comprises:
    an execution result handler configured to send the result to each of the nodes.

4. The system of claim 1, wherein the mediated secure computation manager further comprises:
    a logical circuit determination manager configured to obtain the logical circuit based on logic associated with a function that is configured to generate the result based on one or more input values.

5. The system of claim 1, wherein the mediated secure computation manager further comprises:
    a logical circuit determination manager configured to obtain the logical circuit based on logic associated with a function that is configured to generate the result based on one or more input values associated with one or more of an auction, a fraud detection system, a game, a credit card clearing house system, or a competitive transaction system.

6. The system of claim 1, wherein the mediated secure computation manager further comprises:
    a logical circuit determination manager configured to obtain the logical circuit based on logic associated with a function that is configured to generate the result based on one or more input values, wherein the logical circuit includes one or more binary gates, each binary gate configured to receive binary input values.

7. The system of claim 1 wherein the logical circuit execution manager is further configured to obtain the result based on verifying a correctness of each encrypted portion of the logical circuit and executing the logical circuit, based on combining input values associated with the logical input wires associated with each one of the gates, based on truth tables associated with the encrypted portions of the logical circuit received at the server.

8. A system comprising:
a network node processing engine including:
- a node identifier manager configured to receive, at a node included in a plurality of nodes associated with a network, a unique identifier value assigned to the node by a server;
- a portion encryption manager configured to encrypt a portion of a logical circuit, the logical circuit including one or more gates, each gate associated with one or more logical input wires and one or more logical output wires, the logical circuit associated with a function, wherein the encrypted portion is encrypted based on a random number value that is common to the plurality of nodes and unknown at the server;
- a node portion manager configured to send, to the server, the encrypted portion of the logical circuit and a set of keys corresponding to the node's input on respective logical wires; and
- a result receiving manager configured to receive a result from the server based on execution of the logical circuit, based on combining the encrypted portion with one or more other encrypted portions of the logical circuit received at the server from one or more other nodes of the plurality of nodes associated with the network and based on the sets of keys received from each of the nodes.

9. The system of claim 8 wherein:
the node identifier manager is configured to receive, at the node included in the plurality of nodes associated with the network, the unique identifier value assigned to the node by the server, wherein the unique identifier is assigned based on counting values associated with a number of the plurality of nodes, and
the node portion manager is configured to send, to the server, the encrypted portion, based on one or more representations associated with one or more gates included in the logical circuit, and one or more representations of remaining encrypted portions of the logical circuit, the one or more representations of remaining encrypted portions encrypted based on a hash function, and
the network node processing engine further includes:
- a node challenge manager configured to send, to the server, a timestamp value and the unique identifier value, encrypted based on a signature associated with the node.

10. The system of claim 8 wherein the network node processing engine further includes:
a node logical circuit determination manager configured to obtain the logical circuit based on logic associated with a function that is configured to generate the result based on one or more input values.

11. The system of claim 8 wherein:
the node portion manager is configured to send, to the server, the encrypted portion of a logical circuit, the logical circuit including one or more gates, each gate associated with the one or more logical input wires and the one or more logical output wires, each gate represented by one or more truth tables associated with the encrypted portion of the logical circuit, wherein the logical circuit is associated with a function, wherein the encrypted portion is encrypted based on a random number value that is common to the plurality of nodes and unknown at the server.

12. A method comprising:
assigning a unique identifier value to each one of a plurality of nodes included in a network;
receiving, at a server, an encrypted portion of a logical circuit and a set of keys corresponding to the node's input on respective logical wires from each of the nodes, the logical circuit including one or more gates, each gate associated with one or more logical input wires and one or more logical output wires, the logical circuit associated with a function, wherein each encrypted portion is encrypted based on a random number value that is common to the plurality of nodes and unknown at the server; and
obtaining a result based on executing the logical circuit, based on combining the encrypted portions of the logical circuit received at the server and based on the sets of keys received from each of the nodes.

13. The method of claim 12 wherein:
assigning a unique identifier value includes assigning the unique identifier value to each one of the plurality of nodes included in the network, based on counting values associated with a number of the plurality of nodes, the method further comprising receiving, from each one of the nodes, a timestamp value and the unique identifier value, encrypted based on a signature associated with the node, and wherein
receiving, at a server, an encrypted portion of a logical circuit includes receiving, at the server, from each one of the nodes, the encrypted portion, based on one or more representations associated with one or more gates included in the logical circuit, and one or more representations of remaining encrypted portions of the logical circuit, the representations of remaining encrypted portions encrypted based on a hash function, wherein the method further includes verifying the representations associated with the one or more gates based on comparing the representations of the remaining encrypted portions received from the nodes.

14. The method of claim 12 further comprising:
sending the result to each of the nodes.

15. The method of claim 12 further comprising:
obtaining the logical circuit based on logic associated with a function that is configured to generate the result based on one or more input values.

16. The method of claim 12 further comprising:
obtaining the logical circuit based on logic associated with a function that is configured to generate the result based on one or more input values associated with one or more of an auction, a fraud detection system, a game, a credit card clearing house system, or a competitive transaction system.

17. The method of claim 12 further comprising:
obtaining the logical circuit based on logic associated with a function that is configured to generate the result based on one or more input values, wherein the logical circuit includes one or more binary gates, each binary gate configured to receive binary input values.

18. The method of claim 12 wherein:
obtaining a result includes obtaining the result based on verifying a correctness of each encrypted portion of the logical circuit and executing the logical circuit, based on combining input values associated with the logical input wires associated with each one of the gates, based on truth tables associated with the encrypted portion of the logical circuit received at the server.

19. A method comprising:
receiving, at a node included in a plurality of nodes associated with a network, a unique identifier value assigned to the node by a server;
sending, to the server, an encrypted portion of a logical circuit and a set of keys corresponding to the node's input on respective logical wires, the logical circuit including one or more gates, each gate associated with one or more logical input wires and one or more logical output wires, the logical circuit associated with a function, wherein the encrypted portion is encrypted based on a random number value that is common to the plurality of nodes and unknown at the server; and
receiving a result from the server based on execution of the logical circuit, based on combining the encrypted portion with one or more other encrypted portions of the logical circuit received at the server from one or more other nodes included in the plurality of nodes associated with the network and based on the sets of keys received from each of the nodes.

20. The method of claim 19 wherein:
receiving, at a node included in a plurality of nodes associated with a network, a unique identifier value includes receiving, at the node included in the plurality of nodes associated with the network, the unique identifier value assigned to the node by the server, wherein the unique identifier value is assigned based on counting values associated with a number of the plurality of nodes, the method further comprising sending, to the server, a timestamp value and the unique identifier value, encrypted based on a signature associated with the node, and wherein
sending, to the server, an encrypted portion of a logical circuit includes sending, to the server, the encrypted portion, based on one or more representations associated with one or more gates included in the logical circuit, and one or more representations of remaining encrypted portions of the logical circuit, the one or more representations of remaining encrypted portions encrypted based on a hash function, wherein the encrypted portion is encrypted based on a random number value that is common to the plurality of nodes and unknown at the server.

* * * * *